United States Patent
Molz et al.

(10) Patent No.: US 7,582,846 B2
(45) Date of Patent: Sep. 1, 2009

(54) HYBRID PLASMA-COLD SPRAY METHOD AND APPARATUS

(75) Inventors: Ronald J. Molz, Mt. Kisco, NY (US); David Hawley, Kings Park, NY (US); Richard McCullough, Westbury, NY (US)

(73) Assignee: Sulzer Metco (US), Inc., Westbury, NY (US)

( * ) Notice: Subject to any disclaimer, the term of this patent is extended or adjusted under 35 U.S.C. 154(b) by 256 days.

(21) Appl. No.: 11/642,651

(22) Filed: Dec. 21, 2006

(65) Prior Publication Data

US 2007/0138147 A1  Jun. 21, 2007

Related U.S. Application Data

(60) Provisional application No. 60/752,061, filed on Dec. 21, 2005.

(51) Int. Cl.
 *B23K 10/00* (2006.01)
(52) U.S. Cl. .............................. 219/121.47; 219/76.16; 219/121.48; 118/715
(58) Field of Classification Search ............. 219/121.5, 219/121.52, 121.47, 121.59, 76.16, 76.15, 219/121.48; 118/715, 446, 230
See application file for complete search history.

(56) References Cited

U.S. PATENT DOCUMENTS

| 3,914,573 | A | * | 10/1975 | Muehlberger | ............ 219/76.16 |
| 4,540,121 | A | | 9/1985 | Browning | |
| 4,780,591 | A | * | 10/1988 | Bernecki et al. | ........ 219/121.52 |
| 4,909,914 | A | * | 3/1990 | Chiba et al. | ................. 204/164 |
| 5,302,414 | A | | 4/1994 | Alkhimov et al. | |
| 5,573,682 | A | | 11/1996 | Beason, Jr. et al. | |
| 5,637,242 | A | | 6/1997 | Muehlberger | |
| 2003/0178511 | A1 | | 9/2003 | Dolatabadi et al. | |
| 2005/0252450 | A1 | * | 11/2005 | Kowalsky et al. | ............ 118/715 |
| 2007/0243335 | A1 | * | 10/2007 | Belashchenko | ............. 427/451 |

OTHER PUBLICATIONS

European Search Report, Apr. 11, 2007, European Patent Application No. EP 06126123.

* cited by examiner

*Primary Examiner*—Mark H Paschall
(74) *Attorney, Agent, or Firm*—Greenblum & Bernstein, P.L.C.

(57) ABSTRACT

The present invention provides a method and apparatus of producing a dense coating with desirable stress conditions similar to coatings produced by a cold spray processes, but with higher process efficiencies and lower gas consumption. The inventive process combines features of a plasma process method of gas heating and a cold spray process to accelerate the gas, incorporating these elements into a single hybrid process.

30 Claims, 3 Drawing Sheets

HYBRID PLASMA-COLD SPRAY METHOD AND APPARATUS

CROSS REFERENCE TO RELATED APPLICATIONS

This application claims priority under 35 U.S.C. § 119(e) from U.S. Provisional Patent Application No. 60/752,061, filed on Dec. 21, 2005, which is incorporated herein in its entirety by reference.

STATEMENT REGARDING SPONSORED RESEARCH OR DEVELOPMENT

Not Applicable

REFERENCE TO SEQUENCE LISTING

Not Applicable

BACKGROUND OF THE INVENTION

1. Field of the Invention

The present invention relates to a method and apparatus for producing coatings using supersonic gas flow. More specifically, the present invention relates to a method and apparatus that applies coatings using a hybrid of plasma and cold-spray coating techniques.

2. Description of Related Art

Plasma thermal spray processes have been used in the coatings industry for many years. The plasma thermal spray process basically involves spraying molten or heat softened material onto a substrate to form a coating. Feedstock material, typically in powder form, is injected into a high temperature plasma flame, where it is rapidly heated and accelerated to a high velocity. Plasma guns can readily produce gas/plasma temperatures in excess of 6000 degrees C. The transfer of electrical energy to thermal energy is fairly efficient, with almost all of the losses occurring as waste heat taken out of the nozzle and electrode section as a result of the temperature and latency of the gas.

Although cold spray concepts first were patented at the turn of the $20^{th}$ century, compared with plasma technology, commercial application of cold spray technology is a much more recent addition to the industry. Cold spray has the advantage of producing cold coatings with minimal heat input that can result in the coating material approaching the wrought properties of the source material itself. A key characteristic of a cold spray coating is the resulting compressive stress that exists in the coating. Classic thermal spray processes that produce coating as a result of melting or partial melting of the feedstock material result in tensile stresses as the coating cools and contracts. These tensile stresses often result in cracking of the coating, especially when producing thick layers or combining different layers of dissimilar materials.

Recent advances with plasma guns have made the feasibility of a hybrid process possible. For example, cascaded plasma guns enabled the practical extension of the plasma arc and the overall bore length to increase the gun operating voltage and thus the efficiency of the heat transfer to the gas. This has also led to the potential to separate the generation of plasma from gas dynamics. Also, incorporation of a step or discontinuity in the nozzle section of a plasma gun to plant the arc at the base of the nozzle has enable a separation of gas dynamics from the arc itself. It is then possible to utilize the generation of plasma as a thermal source separate from the nozzle as a method of gas acceleration. Another advance has been the design of an extended nozzle to permit the incorporation of a convergent/divergent section to the nozzle to accelerate the hot gas/plasma to supersonic velocities after the gas was heated by a plasma arc.

Supersonic velocities in plasma guns have been achieved in a number of previous designs. But the velocity in these designs has been limited to approximately Mach 1 in standard operating environments. Greater velocities have been achieved using designs that require costly process variations, such as operation in a vacuum or the use of large amounts of gas (e.g., helium) to achieve the higher velocities. In these previous cases the gas/particle temperatures were too high and often well in excess of the material melting temp. In addition, with the plasma process and even the high velocity oxygen fuel (HVOF) and cold spray processes, the operating efficiency and expected hardware life decreased rapidly as gas velocities increased. This is due to the nature of the design to accelerate the gas in conjunction with the heating of the gas using conventional plasma guns. Also, as gas flows and pressures are increased in a conventional plasma gun, the stability of the arc decreased and the arcs become more constricted.

Thus, in light of the factors described above, there remains a need in the art for a coating deposition process that achieves the beneficial compressive stress of cold spray coatings while providing a wider operating range of both particle velocities and temperatures than can be achieved by conventional cold spray or plasma techniques.

SUMMARY OF THE INVENTION

The present invention provides a method and apparatus of producing a dense coating with desirable stress conditions similar to coatings produced by a cold spray processes, but with higher process efficiencies and lower gas consumption. The inventive process combines features of a plasma process method of gas heating and a cold spray process to accelerate the gas. The deposition process does not melt the material feedstock particles in the effluent stream, but uses a convergent/divergent nozzle to accelerate the heated gas to supersonic speed. Material feed injection is accomplished past the divergent section of the nozzle in to the supersonic gas flow. As a result, the present invention provides a more efficient mechanism for producing coatings with the desirable features of a cold-spray coating, but with the potential for a wider operating range of particle velocities and temperatures not available to conventional plasma or cold-spray deposition techniques.

In one aspect of the invention, a coating method is provided, wherein the coating method uses a hybrid process that combines the thermal energy associated with the plasma thermal spray process with the kinetic energy of the cold spray process. In one step of the method, a process gas is introduced into a plasma thermal spray gun at a flow sufficient for ionization and acceleration for the application of a coating. Next, one or more electric arcs are used to ionize the process gas, thus heating the gas to temperatures in excess of 2000 degrees C. with the arc occurring between on or more cathodes and one or more anodes that have a discontinuity for attaching the arc. In another step, the heated gas is accelerated to supersonic velocities by a nozzle downstream of the arc attachment that has a convergent/divergent section with a throat therein between. A final step of the method includes injecting material feed stock into the resulting high velocity hot gas stream downstream of the accelerating nozzle. The feed stock can be injected either internal to the bore of the nozzle or at the exit of the nozzle.

In another aspect of the invention, an apparatus for applying a coating is provided, the apparatus including one or more cathodes that generate electrical arcs, with each cathode having its own source of regulated current. The cathodes are located central to a surrounding chamber where the gas suitable for ionization is introduced such that the gas passes across the cathodes and through the resulting arcs. The apparatus includes a section of bore that is electrically neutral but that can support the partial passage of an electric arc during ignition to permit generation of a longer arc and increase the voltage potential between the cathode and anode. The apparatus further includes an anode section that can be part of the nozzle or as a separate section that contains a step or edge for the purpose of seating the other end of the electric arc and stabilize the arc length independent of the gas dynamics. A nozzle is also included in the apparatus. The nozzle has a convergent/divergent section with a throat portion therein. The geometry of the convergent/divergent section is such as to generate heated gas velocities of at least Mach 1.2. Finally, the apparatus includes one or more material feedstock injectors located in the bore of the nozzle downstream of the convergent/divergent section, either at the exit of the nozzle or past the exit of the nozzle.

Additional aspects and advantages of the invention will be set forth in the description which follows, and in part will be obvious from the description, or may be learned by practice of the invention. The aspects and advantages of the invention may be realized and obtained by means of the instrumentalities and combinations particularly pointed out hereinafter.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings.

Figure 1:
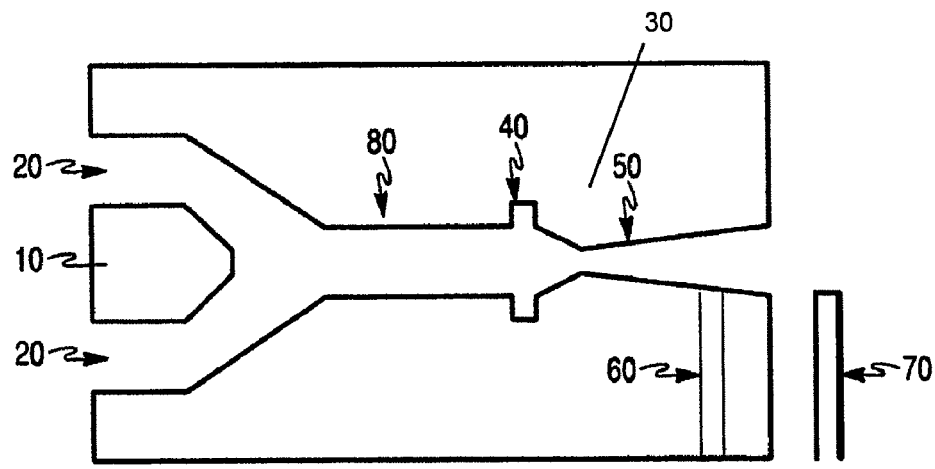
FIG. 1 provides a schematic of a conventional plasma spray gun having been modified in accordance with the present invention.

FIG. 1 depicts one embodiment of a hybrid gun in accordance with the present invention. While the hybrid gun of FIG. 1 is described in terms of retrofit of an existing plasma gun, the described features are also contemplated for use as original factory equipment. In the figure, an electrode 10 remains typical of a plasma gun along with a gas injection inlet(s) 20 at the rear of the gun. A nozzle 30 is elongated to include a step 40 and a convergent/divergent section 50. The convergent/divergent supersonic nozzle section 50 can also be electrically isolated from the anode section 80 of the nozzle 30 to assist in preventing the arc from entering the supersonic nozzle section 50. Suitable material construction of the nozzle bore walls to withstand both heat and abrasion is required for hardware life. For example, materials such as lanthanated or thoriated tungsten are suitable for this application. In addition, the gun operating power of the present invention will be lower than that of a typical plasma gun with gas temperatures typically below 9000 degrees K. Powder injection can be either internal to the bore, as shown in powder injection port 60, or past the nozzle exit, as shown in powder injection port 70.

In certain embodiments, the hybrid gun may be operated in a fashion typical of a plasma gun with the exception being that the gas flows are increased as necessary, commensurate to the throat area of the nozzle, to produce supersonic gas flows. Due to the high temperature of the plasma (relative to the cold spray process) the amount of actual gas required is a fraction of that compared to a typical cold spray gun, while the particle velocities are considerably higher than that achieved with a conventional plasma gun. Using classical isentropic flow for a compressible fluid, it can be seen that the high gas temperature contributes more to the velocity than the actual pressure or flow through a critical orifice as the gas velocity is directly proportional to the square root of the gas temperature.

Transfer of thermal energy to the particles is limited due to the following: (a) a very short duration (latency) in the hot gas/plasma prior to impacting the substrate, (b) a drop in temperature that occurs in the hot gas as it expands in the divergent portion of the nozzle prior to material feedstock injection, and (c) the use of particle sizing larger than 15 μm. In certain embodiments particle sizes of greater than about 15 μm should be used, and still other embodiments may utilize a range of particles between about 30 μm to 75 μm.

Control of particle temperature below the melting point of the material itself can be affected by the spray distance used, length and expansion angle of the divergent portion of the nozzle, location of material injection, and also the type of injection. Where particle temperature is very critical, the use of a liquid suspension—where a portion of the thermal energy is consumed in boiling the liquid off—can be used to enhance the process by further limiting the resulting particle temperature. Liquid-based feedstock may be in the form of a liquid bearing suspended particulates, liquid precursors, liquid solutions containing dissolved salts, and the like.

While modification of a conventional plasma gun will produce acceptable results, superior results would be obtained by optimizing a gun design for the purpose of the hybrid process according to embodiments of the invention. The reason is the limitation of geometry that restricts typical plasma guns from achieving ideal operation for high velocity, that is, low temperature (relative to plasma spraying). The limitation results from the requirement to establish and maintain a stable arc within the bore of the plasma gun such that the current density is sufficiently low at high pressures and length of the arc is constant.

Figure 2:
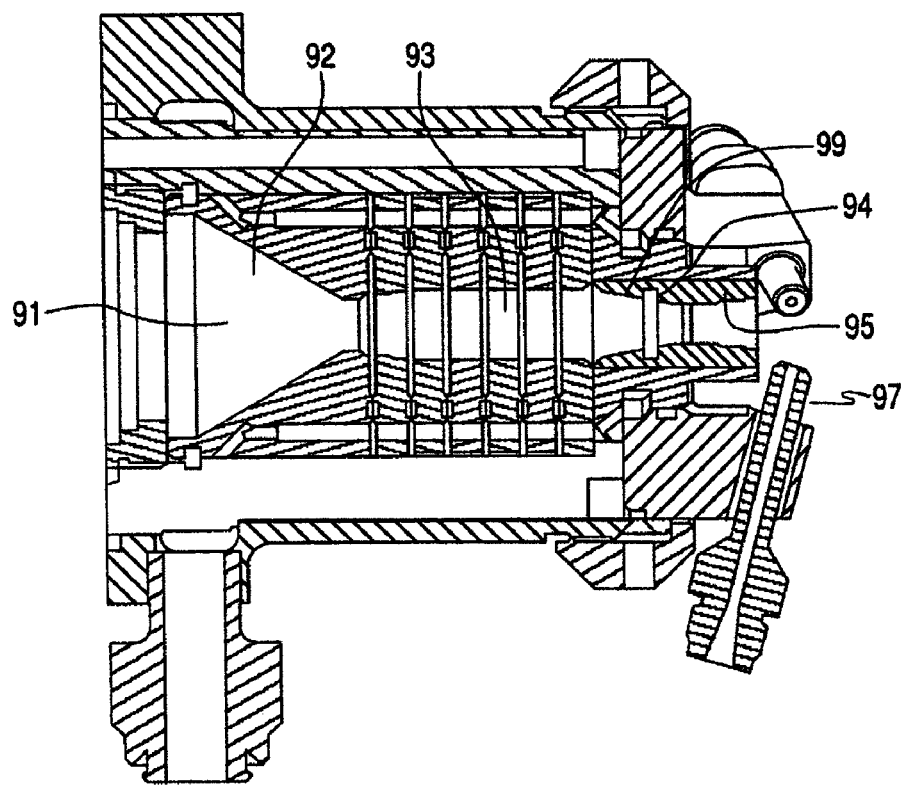
FIG. 2 provides a cross-sectional schematic of a triple arc cascaded plasma gun in accordance with the present invention.

FIG. 2 depicts a cross section of one embodiment of a triple arc cascaded plasma gun which is suitable for use in accordance with the present invention. The rear gun chamber 91 contains three cathodes and a gas injection ring (not shown for clarity). The first neutrode segment 92 has suitable arc geometry to enable a short initial arc length while the remaining neutrode segments 93 serve to provide a longer arc path as the gas flow is increased. The anode segment 99 serves as the nozzle and has a step 94 to seat the arc and a supersonic convergent/divergent nozzle section 95 to accelerate the gas.

Past the exit bore of the nozzle section 95 are powder injectors 97. The nozzle section 95 shown is for low Mach numbers and can produce gas velocities on the order of 400 to 1000 meters per second depending upon total gas flow and gun power. Nozzles with higher Mach numbers and subsequently higher gas velocities are also possible with this design.

The extended length of the arc(s) in a cascaded plasma gun, along with using three distinct arcs, results in a higher operating voltage and more uniform energy density for thorough gas heating. The higher voltage permits lower current densities which extends hardware life to offset the arc constriction that occurs in high pressure conditions. Injection of a feedstock material in powder form prior to the throat of the nozzle in the form of axial injection is also possible. However, this arrangement provides high particle temperatures and partial melting that will result in coatings more similar to those from high velocity oxygen fuel (HVOF) processes rather than cold spray. Axial injection can also be done past the throat with desirable results.

Additional embodiments and/or features of the present invention may include: (a) using a different number of arcs than those specifically disclosed herein; (b) isolation of the anode section incorporating the arc attachment step from the nozzle section or even incorporating three anode circumferential segments, one segment for each arc; (c) further shaping the hot gas/plasma into an elongated plume similar to a rectangular or slotted cold spray nozzle; (d) variations of nozzle geometry, nozzle length, and gas flow to increase or decrease the Mach number of the gas and resulting particle velocities; and/or (e) enlarging the diameter of the rear gas chamber up to the point of arc attachment to the nozzle and altering the placement of the cathodes to decrease the gas velocity in the region of the arcs to alter the transfer of thermal energy to the gas.

Still other features of the present invention may include (f) performing the inventive coating process under ambient pressure conditions ranging from atmospheric down to about 50 mBar; (g) performing the inventive coating process in an inert gas environment; (h) using a shroud gas to contain the gas/particulate stream for the purposes of shaping the plasma plume and an extension to the nozzle; (i) using any suitable process gas for ionization, including one or more of air, argon, nitrogen, helium, hydrogen, oxygen; (l) having an electric arc or arcs of sufficient length to produce a voltage potential in excess of 40 volts DC, and in some embodiments, a voltage over 80 volts; (m) using material feedstock in powder form that has a particle size of about 5 μm to over 100 μm, with a preferred range of 30-75 μm; and/or (n) using material feedstock of liquid bearing suspended particulates that have a particle size of about 1 μm to over 100 μm, with a preferred range of 5-75 μm.

Computational Fluid Dynamics (CFD) Modeling of a triple arc cascade plasma gun using the geometry as shown in FIG. 2 was conducted. The model was operated at back pressures up to 220 psi with a fixed gas heating source representing the plasma arc at 3000 degrees K and Argon as the process gas. Gas velocities in excess of 2400 m/sec (typical for a cold spray process) were indicated while exit temperatures approached ambient conditions of 293 degrees K. Isentropic equations confirmed the results. Further increasing the gas/plasma temperature to 6000 degrees K, increasing backpressure to 300 psi, and using a combination of Argon and Helium produced gas velocities in excess of 5000 m/sec. Based on percentage rate of velocity transferred from gas to particle at around 30%, particle velocities in excess of 1500 m/sec can be achieved. Typical high energy plasma guns generate plasma temperatures in excess of 9000 degrees K and, as such, conversion using a high mach supersonic nozzle would translate into particle velocities achieving and potentially exceeding 2000 m/sec. In addition, as more energy is input to the process the exit temperatures fall even further to below ambient conditions enabling true cold spray conditions for those materials that are ductile at the lower temperatures such as copper or zinc.

A recently developed triple arc cascade plasma gun was operated using the design features as indicated above (e.g., cascaded plasma gun, incorporation of a step or discontinuity in the nozzle section, and an extended nozzle). As the operating pressure and current of the plasma gun was increased it was noted that the actual plasma plume that appeared out the front of the gun at the nozzle exit began to shrink. This seemed to conflict normal physical law with regard to plasma guns in that as the gas flow and energy input (current) increases the plasma plume gets larger, coincident with the increase in energy input. Application of coatings at these high energy parameters yielded coatings with compressive stress, indicative with colder coatings. Furthermore the resulting substrate temperature was considerably lower than what would be expected with a plasma sprayed coating. Analysis of the findings indicated that the plasma gun was in fact operating in an operating regime reserved for processes such as HVOF and possibly cold spray.

There then exists the potential to augment the operation of a plasma gun such that the operating window can be extended to the point where a hybrid plasma gun could in fact be used to produce "cold" coatings, contrary to conventional understandings. Consequently a hybrid plasma gun uses far less gas than a conventional cold spray device and as such the bow shock affect in front of the substrate would be considerably less resulting in lower heat transferred to the substrate as well as less deflection of particles.

Embodiments of the invention as defined herein use a plasma arc similar to that produced by a plasma thermal spray gun to heat a supplied source of process gas. The process gas can be any inert or reactive gas that can be readily ionized by an electric arc. The plasma arc occurs at the back portion of the gun such that the gas is heated by the arc prior to reaching the nozzle. The nozzle incorporates a discontinuity to attach the arc followed by a convergent/divergent section that accelerates the hot gas/plasma to supersonic speed. Material feedstock is injected into the plasma/hot gas stream downstream or past the divergent nozzle section and is subsequently accelerated to supersonic speed by the gas.

In one embodiment of the invention, a typical plasma thermal spray gun can be modified to incorporate the following features:

(1) The gun is enhanced to handle a high backpressure sufficient to support high gas velocities through a supersonic nozzle that can be as high as 100 psi inside the gun;
(2) The nozzle is altered to incorporate a step to seat the plasma arc at the beginning of the convergent section of the nozzle; and
(3) The nozzle length is extended and incorporates a convergent/divergent section at the end of the nozzle.

Alternatively, apparatus can be manufactured to specifically include the above features as original factory equipment.

Figure 3:
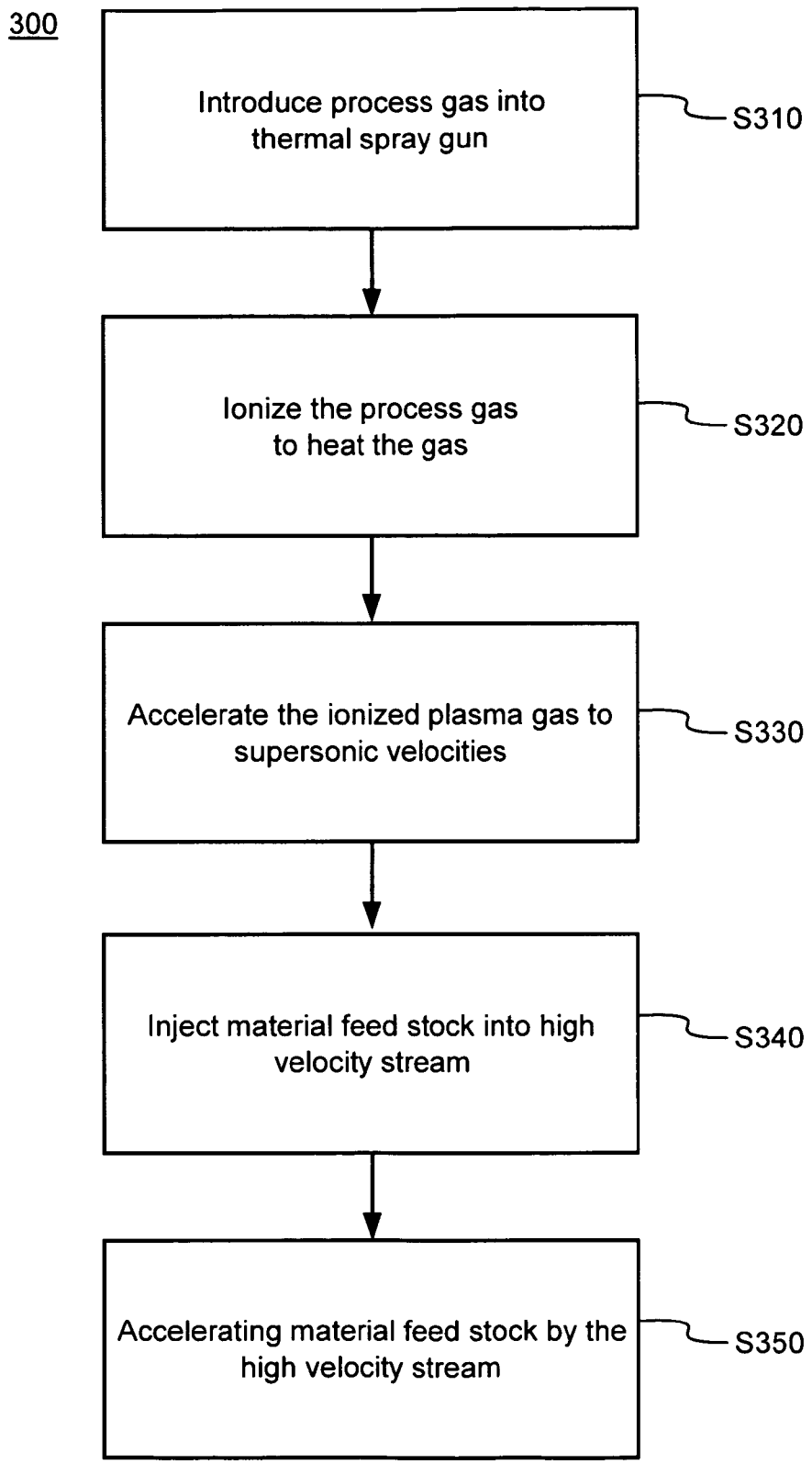
FIG. 3 provides a flow chart of a method for applying a coating using a hybrid process in accordance with embodiments of the present invention.

FIG. 3 provides a flow chart of a method 300 for applying a coating using a hybrid process in accordance with embodiments of the present invention that combines the thermal energy associated with the plasma thermal spray process with the kinetic energy of the cold spray process. In step S310, a process gas (or gasses) are introduced into a thermal spray gun at a flow sufficient for ionization and acceleration for the application of coatings. In step S320, the process gas is ionized using one or more electric arcs to heat the gas to temperatures in excess of 2,000 degrees C. with the electric arc occurring between one or more cathodes and one or more anodes. In step S330, the ionized plasma gas is accelerated to supersonic velocities by a nozzle downstream of the arc attachment that has a convergent/divergent section with a throat therein between. In step S340, material feed stock is injected into the resulting high velocity hot gas/plasma stream downstream of the accelerating nozzle throat either internal to the bore of the nozzle or at the exit of the nozzle. Finally, in step S350, the material feed stock is accelerated by the high velocity hot gas/plasma stream to achieve particle velocities from 600 to 2000 m/sec.

Experimental Results

A triple arc cascaded plasma gun was modified to include an elongated nozzle with a step in the nozzle and a convergent divergent section similar to FIG. 2. The throat of the nozzle was 5 mm in diameter while the divergent diameter was 9 mm. The plasma gun was previously modified to handle higher back pressures in the gun including changes to gas injection method and redundant gun seals. The gun was setup on a plasma controller modified to permit additional gas flow and pressure than typical for a plasma gun and higher arc voltages from the power supply. Material feed stock injection occurred past the exit point of the nozzle using three injectors arranged in a radial orientation.

Figure 4:
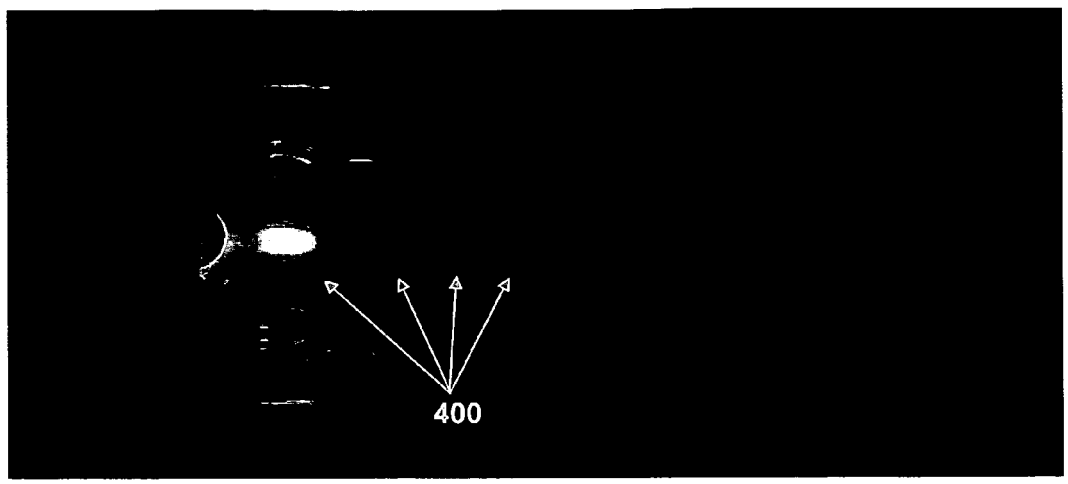
FIG. 4 provides an image of shock diamonds in plasma plume and material injection of tungsten carbide noting lack of glowing from injected particles.

The gun was started and operated with pure Argon and the gas flows then adjusted to 100 NLPM of Argon, 200 NLPM of Helium, and 10 NLPM of Nitrogen. Current was set to 450 amps and voltage recorded at 192 VDC. Backpressure measured at the gun was around 80 psi. Observation of the short plasma plume indicated the presence of at least 4 shock diamonds 400 (shown in FIG. 4). A Tungsten Carbide material feed stock with a size distribution ranging from 5 µm to 31 µm was injected into the hot gas/plasma stream at a rate of 75 g/min. Measured particle velocities exceeded 700 m/sec and the particle temperature was lower than could be read by equipment used to measure particle temperatures down to 1000 degrees C. Visual observation showed very little glow to the particles if any at all indicating a very low temperature relative to classical thermal spray and specifically for the typical plasma spray process. A set of coating samples was sprayed using the parameter and the following results obtained:

1. Immediately after spraying the temperature of the samples was far lower than that of a typical plasma or even HVOF coating with a recorded temperature of 150 degrees C.
2. Upon visual inspection of the coating on a thin substrate that was secured to a solid backing during spraying showed evidence of bending in the convex direction indicative of compressive stress in the coating.
3. Samples submitted to the lab show porosity of less than 1% with an ideal structure and high hardness.

Figure 5:
FIG. 5 provides a micro-photograph of the coating structure showing high level of carbides indicating very low heat input into the process.

FIG. 5 provides a micro-photograph of the coating structure showing high level of carbides indicating very low heat input into the process. The coating is the actual tungsten carbide coating produce using the experimental procedures described above.

At higher operating flows and pressures, particle velocities in excess of 900 m/sec were achieved with various materials including Titanium. The maximum gas flow used was under 400 NLPM, which is far less than the typical gas flows used in the cold spray method to achieve similar particle velocities. Even higher particle velocities can be obtained by increasing gas flow and power levels further but require further modification of the control equipment (power supply and gas controls) to handle the higher demands as well as elongation of the cascade section to increase gun voltage. Observations made of the plasma plume also showed that as more gas pressure and arc power was input to the process the plume got smaller and obviously colder as indicated in the computer models.

Similarly a lengthened nozzle was fabricated and tested on the same gun with a step and an oval shaped divergent exit instead of a round divergent exit. This nozzle operated similar to the previous nozzle in that at least 4 shock diamonds were observed. Injecting the same powder as previously into the flame produced characteristics similar to that obtained with a round nozzle.

The aspects and other advantages of the invention will be realized and attained by the structure particularly pointed out in the written description hereof as well as the attached Appendices. It is to be understood that both the foregoing general description and the following more detailed description (as contained in the Appendix) are exemplary and explanatory and are intended to provide further explanation of the invention as will be later claimed. Accordingly, various modifications may be made without departing from the spirit or scope of the general invention concept.

The invention claimed is:

1. A method of applying a coating to a substrate, said method comprising the steps of:
   introducing a process gas into a thermal spray gun at a flow sufficient for ionization and acceleration for the application of coatings;
   ionizing the process gas using one or more electric arcs to heat the gas to temperatures in excess of 2,000 degrees C. with the one or more electric arcs occurring between one or more cathodes and one or more anodes, the one or more electric arcs being seated in an arc attachment step;
   accelerating the ionized plasma gas to supersonic velocities by a nozzle, having a convergent/divergent section with a throat therein between downstream of the arc attachment step;
   injecting material feed stock into the resulting high velocity hot gas/plasma stream downstream of the accelerating nozzle throat either internal to the bore of the nozzle or at the exit of the nozzle; and
   accelerating the material feed stock by the high velocity hot gas/plasma stream to achieve particle velocities from 600 to 2000 m/sec.

2. The method of claim 1, wherein the method is performed under ambient pressure conditions ranging from atmospheric pressure down to 50 mBar.

3. The method of claim 1, wherein the method is performed in air or in an inert gas environment.

4. The method of claim 1, wherein the process gas is one of air, argon, nitrogen, helium, hydrogen, oxygen, and any combination thereof.

5. The method of claim 1, wherein the electric arc or arcs are of sufficient length to produce a high voltage potential in excess of 40 volts DC.

6. The method of claim 5, wherein the electric arc or arcs are of sufficient length to produce a high voltage potential in excess of 80 volts DC.

7. The method of claim 1, wherein the material feedstock is a powder that has a particle size range of about 5 µm or greater.

8. The method of claim 7, wherein the material feedstock has a particle size range of about 30 µm to 75 µm.

9. The method of claim 1, wherein the material feedstock is a liquid-based feedstock.

10. The method of claim 1, wherein the material feedstock is a liquid bearing suspended particulates in the range of about 1 μm to 75 μm.

11. The method of claim 1 wherein the at least one electrical arcs comprises three distinct arcs used for ionizing and heating the process gas.

12. The method of claim 1, wherein the arc attachment step is located within the nozzle.

13. An apparatus for applying a thermal spray coating, comprising:
    one or more cathodes used as emitters for generating electrical arcs, said cathodes located such that gas suitable for ionization passes across the cathodes;
    a section of bore that is electrically neutral but can support the partial passage of an electric current during ignition to lengthen the arc and increase the voltage;
    an anode section that contains an arc attachment step or edge structured and arranged to seat an other end of the electrical arcs and stabilizing an arc length;
    a nozzle, having a convergent/divergent section with a throat therein between, downstream of the arc attachment step, wherein the geometry of the convergent/divergent section is such as to generate mach numbers in excess of 1; and
    one or more material feedstock injectors.

14. The apparatus of claim 13, wherein the electrical arc or arcs are of sufficient length to produce a high voltage potential in excess of 40 volts DC.

15. The method of claim 14, wherein the electrical arc or arcs are of sufficient length to produce a high voltage potential in excess of 80 volts DC.

16. The apparatus of claim 13, wherein the material feedstock injectors are adapted to provide powder that has a particle size range of about 5 μm or greater.

17. The apparatus of claim 16, wherein the material feedstock injectors are adapted to provide powder that has a particle size range of about 30 μm to 75 μm.

18. The apparatus of claim 13, wherein the material feedstock injectors are adapted to provide a liquid-based feedstock.

19. The apparatus of claim 13, wherein the material feedstock injectors are adapted to provide a liquid bearing suspended particulates in the range of about 1 μm to 75 μm.

20. The apparatus of claim 13, wherein each cathode has its own source of electrical current.

21. The apparatus of claim 13, wherein said anode section is part of the nozzle.

22. The apparatus of claim 13, wherein said anode section is a separate section from the nozzle.

23. The apparatus of claim 13, wherein said material feedstock injector is located in the bore of the nozzle downstream of the throat.

24. The apparatus of claim 13, wherein said material feedstock injector is located at the exit of the nozzle.

25. The apparatus of claim 13 wherein the electrical arcs comprise at least three distinct arcs used for ionizing and heating the process gas.

26. The apparatus of claim 13, wherein the arc attachment step is disposed within the nozzle.

27. A hybrid plasma/cold spray systems, comprising:
    (a) a gun comprising
        one or more cathodes used as emitters for generating electrical arcs;
        a section of bore that can support the partial passage of an electric current during ignition to lengthen the arc and increase the voltage;
        an anode section that contains an arc attachment step or edge structured and arranged to seat an other end of the electrical arcs;
        a nozzle, having a convergent/divergent section and a throat, downstream of the arc attachment step, wherein the geometry of the convergent/divergent section is such as to generate mach numbers in excess of 1; and
        one or more material feedstock injectors; and
    (b) a gas consisting of one of air, argon, nitrogen, helium, hydrogen, oxygen, and any combination thereof for passing across said cathodes, wherein said gas is ionized by passing across said cathode to form ionized plasma gas, and said ionized plasma gas is accelerated to supersonic velocities, and wherein material feed stock is injected into the resulting high velocity ionized plasma and propelled toward a substrate.

28. The system of claim 27, wherein the propelled material feedstock impacts the substrate to form a coating with compressive stress.

29. The system of claim 27 wherein the electrical arcs comprise at least three distinct arcs are used for ionizing and heating the process gas.

30. The system of claim 27, wherein the arc attachment step is formed within the nozzle.

\* \* \* \* \*